United States Patent Office 2,906,745
Patented Sept. 29, 1959

2,906,745
METHYLOL DERIVATIVES OF ROSIN AND ROSIN COMPOUNDS

Dewey R. Levering, Wilmington, Del., assignor to Hercules Powder Company, Wilmington, Del., a corporation of Delaware No Drawing. Application September 6, 1956
Serial No. 608,180

8 Claims. (Cl. 260—97)

The present invention relates to a process for the preparation of saturated carbinols which comprises reacting rosin or an olefinically unsaturated rosin compound with carbon monoxide and hydrogen in an inert solvent in the presence of a cobalt catalyst.

It is known in the art that many compounds that contain olefinic unsaturation can be oxygenated in the so-called "Oxo" process by reacting them with carbon monoxide and hydrogen under elevated temperatures and pressures in the presence of one or more hydrogenation catalysts. The product of such reactions is considerably variable according to the nature of the reactants, the proportions thereof, and the conditions of reaction. For example, the prior art has described the production of esters, acetals, alcohols, aldehydes and other oxygenated compounds from olefinic compounds by various methods involving reaction with carbon monoxide and hydrogen. In most cases, the products actually obtained comprise mixtures of the various oxygenated compounds named above.

The reaction of rosin and olefinically unsaturated rosin compounds with carbon monoxide and hydrogen has been investigated previously to only a limited degree. For example, U.S. Patent No. 2,517,416 to W. W. Prichard describes a process for the preparation of esters having two acetoxy groups on one carbon atom which comprises reacting, in the presence of a cobalt hydrogenating catalyst, carbon monoxide, hydrogen, acetic anhydride and a non-aromatic hydrocarbon having an olefinic double bond. Abietic acid, the primary constituent of rosin, is mentioned among the nonaromatic hydrocarbons which may be utilized as reactants. U.S. Patent No. 2,491,915 to P. L. Barrick et al. describes a process for the preparation of acetals by reacting carbon monoxide, hydrogen and methanol with a compound having one ethylenic unsaturation in the presence of a cobalt catalyst. Abietic acid is mentioned as typical of the compounds which may be utilized as reactants. As can be seen, in the known instances where an unsaturated rosin compound has been suggested as a reactant in the so-called "Oxo" process, the products of the reaction are either esters or acetals.

In accordance with the present invention, it has been found that under certain conditions of reaction rosin and olefinically unsaturated rosin compounds can be reacted with carbon monoxide and hydrogen in the presence of a cobalt catalyst to produce saturated carbinols. The carbinols so produced have been found to possess many interesting properties which render them useful in a variety of different applications.

More specifically, the present invention provides a process which comprises reacting ingredients consisting essentially of carbon monoxide, hydrogen and a material from the group consisting of rosin and olefinically unsaturated rosin compounds in an inert solvent in the presence of a cobalt catalyst at a temperature ranging from about 120° to about 230° C., preferably from about 180° to 200° C., and at a pressure ranging from 1500 to 15,000 p.s.i., preferably from about 3000 to about 6000 p.s.i.

There are many permissible variations in the reaction conditions and proportions of reactants which influence the nature of the final product. Bearing in mind that the invention is specifically concerned with the production of practical yields of carbinols, the variations in reactants, proportions, and reaction conditions which will be hereinafter exemplified and discussed are those which have been found suitable for such purpose.

In order to more fully illustrate the invention, the following illustrative preparations and examples are presented. Percentages are by weight unless otherwise specified.

PREPARATION OF COBALT CARBONYL CATALYST

A 500-cc. stainless steel autoclave was charged with 30 g. of cobalt carbonate and 150 g. of cyclohexane. After pressure testing and flushing, the autoclave was pressured to 3500 p.s.i. of $CO-H_2$ (1:1 ratio) and heated to 160° C. The reactor was kept at 160° C. and 5000–4800 p.s.i. for 2 hours, then cooled to room temperature and vented.

The product was a dark brown solution containing cobalt hydrocarbonyl. On cooling the solution, orange crystals precipitated and were isolated. These crystals were dicobalt octacarbonyl.

Typical analysis of the solution—0.02 g. of cobalt/g. of solution.

Typical analysis of crystals—Found, 33.8% cobalt. Calculated, 34.5% cobalt.

Example 1

A stainless steel rocking type autoclave was charged with 232 parts of a 50% solution of distilled N-wood rosin [acid number 170.5, percent carbonyl (Desseigne) 0.58%, percent hydroxyl (acetylation) 1.9, gasoline insolubility 1.0%] in cyclohexane and 30 parts of cobalt carbonyl solution which contained 0.018 part of cobalt per part of solution. Following a pressure test with nitrogen, the autoclave was flushed with carbon monoxide, pressured to 2000 p.s.i. with a 1:1 molar carbon monoxide-hydrogen mixture, and heating and agitation was started. At 125° C. the pressure had increased to 2700 p.s.i. and it was raised to 5000 p.s.i. The temperature was raised over the period of 3 hours to 180° C. and the pressure was maintained at 5000 p.s.i. by periodically adding more carbon monoxide-hydrogen mixture. The autoclave was maintained at 180° C. for 2 more hours and 350 p.s.i. of gas was absorbed. No drop in pressure was observed during last one hour. The autoclave was then cooled to room temperature, vented and product removed. The product was diluted with more solvent, extracted with dilute hydrochloric acid to remove the catalyst, washed neutral and dried over sodium sulfate. The solvent was removed by distillation under vacuum and a yellow resin was obtained. The product had the following properties: acid number 146.5, percent hydroxyl (acetylation) 3.13, percent carbonyl (Desseigne) 2.98, gasoline insolubility 23%, yield of carbinols 29.5%, and yield of aldehyde derivative 31.5%. A product having similar properties is obtainable by using 2,4-dimethylpentane in place of cyclohexane as the solvent.

Example 2

A stainless steel rocking type autoclave was charged with 250 parts of distilled tall oil (acid number 188, saponification number 188, percent hydroxyl (acetylation) 0.14), 200 parts of cyclohexane and 80 parts of cobalt carbonyl solution (containing about 2 parts of cobalt). The autoclave was flushed, pressure tested at 3000 p.s.i. with a carbon monoxide-hydrogen mixture (1:2 molar ratio) and heated to 200° C. with agitation.

At 200° C. the pressure was raised from 2050 to 5000 p.s.i. and maintained at 5000 p.s.i. by periodic raises. After 3 hours at temperature, 600 p.s.i. of gas was absorbed and the reactor was cooled to room temperature, vented and the product removed. The product was diluted with ether, and extracted with 6 N hydrochloric acid to remove the catalyst. The light yellow ether solution was then washed neutral, dried over sodium sulfate and distilled under vacuum to remove the solvent.

The final product was a light yellow solid which had the following properties: acid number 85, saponification number 178, percent hydroxyl (acetylation) 1.6, and yield of carbinols 84.5%.

Example 3

A stainless steel rocking type autoclave was charged with 250 parts of crushed N-wood rosin [acid number 167.0, saponification number 170.0, percent hydroxyl (acetylation) 0.90, percent carbonyl (Desseigne) 0.54], 150 parts of cyclohexane and 100 parts of cobalt carbonyl solution (containing about 0.03 part of cobalt/g. of solution). The autoclave was flushed, pressure tested with a carbon monoxide-hydrogen gas mixture (1:2 molar ratio) at 3000 p.s.i., and heated to 200° C. with agitation. At 160° C. reaction had started and the pressure was raised from 3000 p.s.i. to 5000 p.s.i. During the heat-up, 900 p.s.i. of gas mixture was absorbed. At 200° C. another 600 p.s.i. of gas was absorbed over a period of 2.1 hours. The autoclave was then cooled to room temperature and vented. The product was diluted with ether, extracted with dilute hydrochloric acid to remove the catalyst, washed neutral and dried over sodium sulfate. The solvent was removed by distillation under vacuum and a light yellow resin was obtained.

The product had the following properties: acid number 144, saponification number 176, percent hydroxyl (acetylation) 4.2, percent carbonyl (Desseigne) 0.28, and percent yield of carbinols 89.5. By using methylcyclohexane as the solvent instead of cyclohexane, a product is obtained which has practically identical characteristics.

Example 4

A stainless steel rocking type autoclave was charged with 169 parts of the methyl ester of rosin [acid number 7.0, saponification number 158, percent carbonyl (Desseigne) 0.12, percent hydroxyl (acetylation) 0.08] and 45 parts of cobalt carbonyl solution (containing 1.03 parts of cobalt). Following a pressure test with nitrogen, the autoclave was flushed with a carbon monoxide-hydrogen mixture (1:1 molar ratio) and heating and agitation was started. At 180° C. the pressure was raised from 2000 to 3700 p.s.i. Over a period of 1½ hours gas absorption took place (650 p.s.i.). The temperature was then raised to 200° C. and in 3½ hours another 400 p.s.i. of gas was absorbed. The autoclave was then cooled, vented and the product was removed. The catalyst was removed from a solution of the product by acid extraction. The solution was then washed neutral and the solvent removed by distillation under vacuum. The product had the following properties: acid number 7.5, saponification number 163, percent hydroxyl (acetylation) 2.9, percent carbonyl (Desseigne) 1.8, yield of carbinols 64%, and yield of aldehyde derivative 23%.

Example 5

A stainless steel rocking type autoclave was charged with 250 parts of WW Nelio gum rosin [acid number 162.5, saponification number 181, percent hydroxyl (acetylation) 0.80, drop softening point 84° C.], 250 parts of cyclohexane, 100 parts of cobalt carbonyl solution (containing about 3 parts of cobalt). The autoclave was flushed, pressure tested with a carbon monoxide-hydrogen gas mixture (1:2 molar ratio) at 3000 p.s.i. and heated to 200° C. with agitation. At 200° C. the pressure was raised to 5000 p.s.i. and over a period of 4 hours 4400 p.s.i. of gas was absorbed (the pressure was maintained at 5000 p.s.i. by periodic raises).

The product was recovered in the manner described in Example 1. The product was a light yellow resin with the following properties: acid number 139, saponification number 168.5, percent hydroxyl (acetylation) 4.0, drop softening point 104° C., and yield of carbinols 92%. When di-n-propyl ether is used as solvent in place of cyclohexane, a product is recovered which is comparable in appearance and properties.

Example 6

A stainless steel rocking type autoclave was charged with 250 parts of pine wood resin [acid number 140, saponification number 166, percent hydroxyl (acetylation) 3.0], 250 parts of cyclohexane and 100 parts of cobalt carbonyl solution (containing about 3 parts of cobalt). The autoclave was flushed, pressure tested with a carbon monoxide-hydrogen gas mixture (1:2 molar ratio) at 3000 p.s.i. and heated to 200° C. with agitation. At 200° C. the pressure was raised from 2300 to 5000 p.s.i. and maintained at 5000 p.s.i. by periodic raises. Over a period of 4 hours 1400 p.s.i. of gas was absorbed.

The product was processed in the manner described in Example 1. The product was an amber colored resin with the following properties: acid number 116, saponification number 159, percent hydroxyl (acetylation) 4.5, and yield of carbinols 52.5%.

Example 7

A stainless steel rocking type autoclave was charged with 30.2 parts of abietic acid (acid number 191, U.V. analysis 92% abietic acid), 200 parts of cyclohexane and 2 parts of dicobalt octacarbonyl. The autoclave was flushed, pressure tested with a carbon monoxide-hydrogen gas mixture (1:2 molar ratio) at 3500 p.s.i. and heated to 200° C. with agitation. After one hour at 200° C. and 4800 p.s.i. pressure, the reactor was cooled to room temperature, vented and the product removed.

The product was processed by the same method as described in Example 1. The final product was a light yellow resinous solid with the following properties: acid number 169, saponification number 170, percent hydroxyl (acetylation) 3.45, percent hydrogen absorption 0.23, U.V. analysis 0.1% abietic acid, and yield of carbinols 72% (based on abietic acid present).

Example 8

A stainless steel rocking type autoclave was charged with 250 parts of N-wood rosin [acid number 167.0, saponification number 177, percent hydroxyl (acetylation) 0.91], 200 parts of benzene and 100 parts of cobalt carbonyl solution containing about 2 parts of cobalt. The autoclave was flushed, pressure tested at 2000 p.s.i. of a 1:2 molar carbon monoxide-hydrogen gas mixture and heated to 200° C. with agitation. Because of a very small leak the pressure was only 1200 p.s.i. when the reactor reached 200° C. and the pressure was raised to 5000 p.s.i. After 1½ hours at temperature, a rapid reaction started and after a total of 6 hours at 200° C. about 2000 p.s.i. of gas was absorbed. The product was processed in the manner described in Example 1 and had the following properties: acid number 144, saponification number 184, percent hydroxyl (acetylation) 2.9, and yield of carbinols 62.5%. The characteristics of the product are not materially altered when the benzene is replaced by toluene as the solvent.

Example 9

A stainless steel rocking type autoclave was charged with 100 parts of distilled N-wood rosin [acid number 170.5, percent hydroxyl (acetylation) 1.9, percent carbonyl (Desseigne) 0.58], 100 parts of cyclohexane, and 5 parts of cobalt acetate tetrahydrate. Following a pressure test with nitrogen, the autoclave was flushed, pressured to 2000 p.s.i. of a 1:1 molar carbon monoxide-hydrogen gas mixture and heating and agitation was started. No reaction occurred on the heat-up to 175° C. and the pressure was raised to 4200 from 3200 p.s.i. After 15 minutes at 180° C., no reaction occurred and the reactor was heated to 200° C. Rapid reaction occurred about 3 hours after reaching 200° C. and, after a total of about 5 hours at 200° C., 1500 p.s.i. of gas was absorbed. The product was processed as in Example 1 and an amber colored resinous solid was obtained which had the following properties: acid number 142.5, percent hydroxyl (acetylation) 2.7, percent carbonyl (Desseigne) 3.8, yield of carbinols 20.5%, and yield of aldehyde derivative 42%.

*Example 10*

A stainless steel rocking type autoclave was charged with 100 parts of N-wood rosin [acid number 167, saponification number 177, percent hydroxyl (acetylation) 0.9, percent hydrogen absorption 1.47], 100 parts of cyclohexane, and 50 parts of cobalt carbonyl solution (containing about 1 part of cobalt). The autoclave was flushed, pressure tested with a carbon monoxide-hydrogen gas mixture (1:13 molar ratio) at 3600 p.s.i. and heated to 180° C. with agitation. At 180° C. the pressure was raised from 3825 to 5000 p.s.i. and maintained at 5000 p.s.i. by periodic raises. Over a period of 3 hours 850 p.s.i. of gas was absorbed.

The product was processed in the manner described in Example 1. The product was a light yellow colored resin which had the following properties: acid number 145, saponification number 162, percent hydroxyl (acetylation) 3.5, percent hydrogen absorption 0.48, percent oxygen absorption—nil, and yield of carbinols 61%. A product somewhat darker in color but containing carbinols in a yield of 65% is obtained by using carbon tetrachloride as the solvent.

*Example 11*

A stainless steel rocking type autoclave was charged with 250 parts of N-wood rosin [acid number 167, saponification number 177, percent hydroxyl (acetylation) 0.9, percent carbonyl (Desseigne) 0.4], 200 parts of cyclohexane, and 100 parts of cobalt carbonyl solution (containing about 3 parts of cobalt). The autoclave was flushed, pressure tested with a carbon monoxide-hydrogen gas mixture (1:1 molar ratio) at 3500 p.s.i. and heated to 140° C. with agitation. After 4½ hours, about 1500 p.s.i. of gas was absorbed (pressure maintained at 5000 p.s.i. by periodic raises).

The product was processed in the manner of Example 1. The yellow resin which was obtained had the following properties: acid number 147, saponification number 152, percent hydroxyl (acetylation) 1.2, percent carbonyl (Desseigne) 2.5, yield of aldehyde derivatives 26%, and yield of carbinols 7%. Similar results are obtained when methyl ethyl ketone is used as solvent.

*Example 12*

A stainless steel rocking type autoclave was charged with 200 parts of N-wood rosin [acid number 167, saponification number 177, percent hydroxyl (acetylation) 0.9] and 5 parts of solid dicobalt octacarbonyl. The autoclave was flushed, pressure tested at 3500 p.s.i. with a carbon monoxide-hydrogen gas mixture (1:2 molar ratio) and heated to 200° C. with agitation. At about 155° C. there was a drop in pressure of about 350 p.s.i. The pressure was raised to 4600 p.s.i. and there was a gradual drop to 4400 p.s.i. as the temperature was raised to 200° C. (This drop in pressure may not be indicative of reaction but rather solution of gas in the rosin after it became molten.) When the reactor reached 200° C., the pressure was raised from 4400 to 5000 p.s.i. and over the next 2.3 hours only 200 p.s.i. of gas was absorbed. Then a rapid reaction began and in the next 3 hours 3800 p.s.i. of gas was absorbed. The reaction was allowed to run another 2 hours and then the autoclave was vented hot and the product was removed while molten.

The product was dissolved in ether and the solution was treated in the same manner as described in Example 1. A light, amber-colored, resinous solid was obtained with the following properties: acid number 128, saponification number 156, percent hydroxyl (acetylation) 3.4, drop softening point 119° C., and yield of carbinols 67%.

*Example 13*

A stainless steel rocking type autoclave was charged with 200 parts of N-wood rosin [acid number 167, saponification number 177, percent hydroxyl (acetylation) 0.9], 10 parts of cyclohexane and 5 parts of solid dicobalt octacarbonyl. The autoclave was flushed, pressure tested at 3500 p.s.i. with a carbon monoxide-hydrogen gas mixture (1:2 molar ratio) and heated to 200° C. with agitation. At about 150° C. there was a drop in pressure of 300 p.s.i. and the pressure was raised to 4600 p.s.i. There was a rather rapid reaction while the temperature was raised from 150° to 200° C. during which time 2000 p.s.i. of gas was absorbed while the pressure was maintained between 4000 and 5000 p.s.i. by periodic raises. The reactor was kept at 200° C. for 4 hours and another 1000 p.s.i. of gas was absorbed (most of which occurred in the first 1½ hours). The autoclave was vented while hot and the product was removed while molten.

The product was dissolved in ether and the solution was treated in the same manner as described in Example 1. A yellow resinous solid was obtained with the following properties: acid number 126, saponification number 159, percent hydroxyl (acetylation) 4.3, and yield of carbinols 90%.

*Example 14*

This example illustrates the recovery of relatively pure carbinols of saturated rosin acids from a crude reaction product derived from rosin.

Two hundred and three parts of a crude reaction product obtained from the treatment of rosin [percent hydroxyl (acetylation) 3.37] was dissolved in approximately 850 parts of dimethylformamide (technical grade). There was added 200 parts of distilled water and the resultant solution was extracted twice with about 2100 parts of n-heptane. There was recovered from the aqueous phase 100.3 parts of carbinols of saturated rosin acids (percent hydroxyl 5.18).

The rosins which may be utilized as reactants according to the invention may be those obtained by extraction from the stumps of the Jeffrey and ponderosa pines as well as the rosins well known to the art, such as, for example, the rosins obtained from the southern long leaf or slash pin tree. The rosins may be either the crude or refined types having color grades from FF to WW and may be of either the wood or gum variety. The refined types of rosin which may be treated in accordance with the invention are those which have been distilled under reduced pressure; distilled under reduced pressure with the injection of an inert gas; extracted with color body solvents; treated with various adsorbents for the removal of various impurities, as color bodies, visible and latent, oxidized resin acids, etc.

In addition to ordinary rosin, there may be utilized olefinically unsaturated rosin compounds, such as partially dehydrogenated or heat-treated rosins, polymerized rosins, and partially hydrogenated rosins. These compounds and also the rosins contain, in addition to various rosin acids, a nonacidic or neutral portion which may be present in amounts varying between 8.7% and about 24.4% by weight. They generally have acid numbers varying between about 140 and 170.

In addition to wood and gum rosins, the olefinically unsaturated rosin compounds which may be treated in accordance with this invention include unsaturated acids obtainable from rosins, such as, for example, abietic, dihydroabietic, neoabietic, dextropimaric, etc.; esters of these rosin acids with a monohydric or polyhydric alcohol, such as methyl abietate, ethyl abietate, glycerol abietate; rosin nitriles; the alcohols produced by the reduction of the carboxyl group of an unsaturated rosin acid, such as dihydroabietyl alcohol, and also the esters of these alcohols. Also, there may be treated according to the invention rosin acids-containing materials, such as tall oil and rosins separated from tall oil, such as sulfate wood rosin. Also, there may be treated various pine wood resins obtained during the process of refining crude rosin to paler grades, which resins are rich in olefinically unsaturated rosin acid content.

The catalysts which have been found operable in the present invention include cobalt and cobalt compounds, such as cobalt, cobalt acetate, cobalt resinate and cobalt carbonyls. By far the preferred catalysts, however, are the cobalt carbonyls including cobalt hydrocarbonyl and dicobalt octacarbonyl, and it is, in fact, believed that in all cases a cobalt carbonyl is the ultimate catalyst and that when other cobalt compounds are utilized to promote the reaction the difference in reaction rate and extent of reaction are directly proportionate to the ease with which these compounds can be transformed to cobalt carbonyl. In any event it has been found that when a preformed cobalt carbonyl is used as the catalyst the rate of reaction is considerably faster and will occur at lower temperatures and to a greater extent than when other cobalt compounds are utilized.

An inert solvent to serve as a vehicle for the reaction is exceedingly helpful in facilitating a rapid reaction and is in fact essential to obtain any reaction at all when catalysts other than cobalt carbonyls are employed. The amount of solvent is widely variable, however, and even a relatively small amount of solvent, for example, an amount as small as about 2–4% of the weight of rosin or unsaturated rosin compound, is beneficial. There is no upper limit on the amount of solvent, but for practical purposes the amount of solvent should not exceed 90% of the combined weight of solvent and rosin or unsaturated rosin compound. In most cases, the preferred amount of solvent is about 50% of the combined weight of solvent and rosin or unsaturated rosin compound. Suitable inert solvents are those in which the rosin or olefinically unsaturated rosin compound and the cobalt catalyst are soluble, but which do not react with the rosin or olefinically unsaturated rosin compound, or with carbon monoxide, hydrogen or the reaction product. Furthermore, the solvent should be readily removable from the product; thus, from a practical standpoint it should be relatively low boiling. Mixtures of solvents may be used.

Particularly satisfactory inert solvents are the hydrocarbons that are devoid of olefinic unsaturation. Such hydrocarbons may be aliphatic, cycloaliphatic or aromatic. Suitable aliphatic hydrocarbons are those containing five to nine carbon atoms, such as n-pentane, n-hexane, n-heptane, n-octane, n-nonane and isomers thereof, such as the heptane compound, 2,4-dimethylpentane, shown in Example 1. Also suitable are those cycloaliphatic hydrocarbons which have five to eight carbons, such as cyclopentane, cyclohexane, methylcyclopentane, methylcyclohexane, and dimethylcyclohexane. Satisfactory aromatic hydrocarbons are those containing six to ten carbon atoms, such as benzene, toluene, o-, m- and p-xylene, ethylbenzene, n-propylbenzene, isopropylbenzene, n-butylbenzene, sec-butylbenzene, isobutylbenzene, t-butylbenzene and mesitylene.

Also useful as solvents are ketones of three to seven carbon atom content, ethers of four to ten carbons, and the chlorinated derivatives of methane and ethane. Exemplary ketones are acetone, methyl ethyl ketone, diethyl ketone, methyl n-propyl ketone, methyl isopropyl ketone, ethyl n-propyl ketone, ethyl isopropyl ketone, methyl n-butyl ketone, methyl isobutyl ketone, methyl sec-butyl ketone, methyl t-butyl ketone, di-n-propyl ketone, diisopropyl ketone, ethyl n-butyl ketone, ethyl isobutyl ketone, methyl n-amyl ketone, methyl isoamyl ketone, cyclopentanone and cyclohexanone. When using such ketones as solvents, it is desirable to carry out the reaction at temperatures of about 120°–160° C., since at higher temperatures some hydrogenation of the solvent may occur.

Representative ethers are diethyl ether, di-n-propyl ether, diisopropyl ether, n-propyl isopropyl ether, di-n-butyl ether, diisobutyl ether, di-n-amyl ether, diisoamyl ether, ethyl n-propyl ether, ethyl isopropyl ether, ethyl n-butyl ether, ethyl isobutyl ether, ethyl t-butyl ether, ethyl amyl ether, ethyl hexyl ether, methyl n-propyl ether, methyl n-butyl ether, methyl isobutyl ether, methyl n-amyl ether, methyl isoamyl ether and butyl propyl ether. The chlorinated derivatives of methane and ethane are illustrated by chloroform, carbon tetrachloride, methylene chloride, 1,1-dichloroethane, 1,2-dichloroethane, 1,1,1-trichloroethane, 1,1,2-trichloroethane, 1,1,2,2-tetrachloroethane, 1,1,1,2-tetrachloroethane and pentachloroethane.

The carbon monoxide to hydrogen ratio is not critical and may vary, on a molar basis, from about 1:1 to 1:20 with a molar ratio of 1:2 to 1:3 being preferred in order to obtain the highest yield of carbinols. As the ratio is raised to about 1:1 and higher, e.g., 2:1, increasing amounts of aldehyde derivatives are obtained.

The reaction can be caused to occur at temperatures ranging from about 120° to 230° C., but the optimum range for the preparation of carbinols is 180° to 200° C. Above 230° C. the decomposition of the rosin or rosin compound becomes appreciable, and below 180° C. increasing amounts of aldehyde derivatives are formed.

The pressure is quite widely variable and may vary from a practical standpoint from about 1500–15000 p.s.i. The usual operating range which has been chosen for convenience and economy is about 3000–6000 p.s.i.

The preferred mechanical procedure to be utilized in effecting the reaction comprises charging a pressure reaction vessel with the rosin or unsaturated rosin compound, the catalyst and solvent and introducing a mixture of carbon monoxide and hydrogen in the desired proportions under pressure while applying heat to the vessel. The reaction generally requires from about 15 minutes to 6 hours for substantial completion. The vessel is then cooled to room temperature and vented, and the product can be recovered by dilution with a solvent, such as ether, extraction with dilute hydrochloric acid to remove the catalyst, washing until neutral and then drying over a desiccant. Finally, the solvent can be removed by distillation under vacuum.

The products obtained by following the general procedure utilized hereinabove vary in physical properties according primarily to the nature of the rosin or unsaturated rosin compound utilized as a reactant. In general, however, they are light-to-amber colored resinous substances having an acid number somewhat less than that of the primary reactant but having a considerably higher hydroxyl number.

Chemically, the products of the invention contain a high proportion of carbinols of the starting rosin or rosin compound which is a result of the introduction of a methylol group at one or more points of olefinic unsaturation. Hydrogenation of double bonds also accompanies the introduction of the methylol group so that the products are normally saturated. Various side reactions occur to a lesser extent depending upon the reaction conditions. For example, esters can be derived from the condensation of the carbinols produced.

In the usual case, only one methylol group is introduced into each unsaturated compound used as a starting material. However, in the case of dextropimaric acid, it has been found that the product contains up to 40% by weight of a dimethylol derivative.

For purposes of illustration, when rosin is treated according to the invention, the product is believed to comprise a mixture of the following compounds: (1) methylol substituted acids derived from abietic acid and dihydroabietic acid with the probable structure:

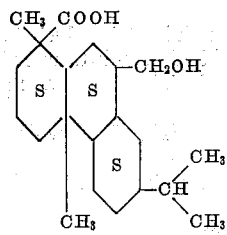

wherein the —CH₂OH group is attached to a ring at a carbon other than a tertiary substituted one, probably 8 or 9; (2) methylol substituted acids derived from dextropimaric acids, probable structure:

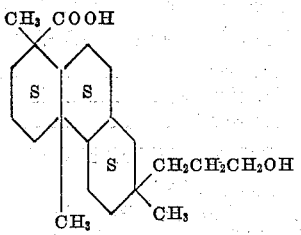

(3) dimethylol-substituted acids derived from dextropimaric acids, probable structure:

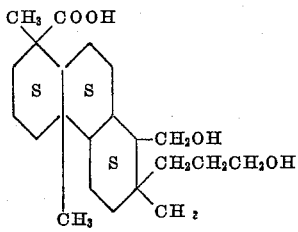

or

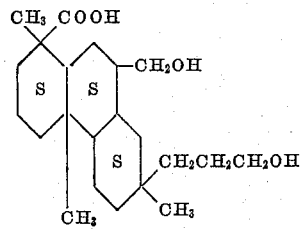

(4) alcohols derived from the olefinically unsaturated compounds in the neutrals; (5) unreacted acids, primarily dehydroabietic and tetrahydroabietic acids; (6) esters derived from the condensation of any of the above compounds; and (7) aldehyde derivatives of the unsaturated rosin acids.

From the above information, the nature of the products produced when the starting material is an unsaturated rosin compound can be readily understood by those skilled in the art. For example, in the case of rosin acid-constaining materials such as tall oil which contains olefinically unsaturated fatty acids, there will also be produced carbinols of such fatty acids.

When the starting material is in the nature of rosin and contains a mixture of neutral and acidic, saturated and unsaturated compounds, relatively pure carbinols can be isolated by conventional purification methods such as solvent extraction. For example, the crude product resulting when rosin is treated according to the invention can be subjected to solvent extraction with a mixture of solvents such as n-heptane and dimethylformamide whereby the methylol-substituted acids are concentrated in one of the resulting phases.

As previously stated, the products of the invention have been found to possess many interesting properties that render them suitable for a variety of uses. For example, the crude mixture of carbinols derived from rosin has a high melting point, light color, excellent color stability and good oxidation resistance. It also has the necessary compatibilities and solubilities for use as a resin in adhesive compositions, alkyd resins, chewing gum, emulsifiers, aniline-type printing inks, emulsion paints and waxes, and polyethylene clarifiers.

The carbinols of the invention are capable of undergoing reactions analogous to the reactions of the rosin or unsaturated rosin compound from which they are derived. For instance, those carbinols possessing an active carboxyl or ester group can be hydrogenolyzed to convert the carboxyl or ester group to an additional methylol group, thus forming a polyhydroxy compound.

As illustrative, carbinols of the methyl ester of rosin or carbinols of the methyl ester of rosin acids prepared according to the invention can be subsequently hydrogenolyzed by known techniques as illustrated in the following examples.

*Example 15*

A stainless steel autoclave was charged with 410 parts of the carbinols derived from the methyl ester of rosin (acid number 26, saponification number 157, percent hydroxyl acetylation 3.65) and 41 parts of powdered copper chromite. After flushing and pressure testing, the autoclave was pressured to 2000 p.s.i. and heated to 290° C. The pressure was maintained at 4800–5000 p.s.i. by periodic additions of hydrogen for 6 hours. At the end of 6 hours, the reactor was cooled to 200° C. and the product removed while hot. The solid product was dissolved in ether and filtered to remove catalyst. The resulting clear solution was dried and distilled to remove the solvent. The final product was a very light yellow solid with the following properties: acid number—nil, saponification number 28, percent hydroxyl acetylation 7.6, and drop softening point 67° C.

*Example 16*

A stainless steel autoclave was charged with 187 parts of the carbinols derived from the methyl ester of mixed olefinically unsaturated rosin acids (acid number 4, saponification number 143, percent hydroxyl acetylation 5.7), and 18.7 parts of powdered copper chromite. The hydrogenolyzation was carried out in the same manner as described in Example 15 and the product was an almost colorless solid with the following properties: acid number—nil, saponification number 8, per cent hydroxyl acetylation 9.8.

The two preceding examples are illustrative of convenient methods of preparing polyhydroxy compounds. In both examples, the product comprises in part a saturated carbinol derived from dihydroabietyl alcohol. If the hydrogenolysis had been carried out prior to the reaction with carbon monoxide and hydrogen in, for instance, Example 15, many of the olefinic linkages would have been saturated so that reaction with carbon monoxide and hydrogen would have occurred to a much lesser extent.

Also, the carbinols derived from rosin and unsaturated rosin compounds according to the invention are capable of undergoing reaction to form a variety of interesting new resin derivatives of higher melting points and different compatibilities and solubilities. As disclosed in copending application Serial No. 465,427, filed October 28, 1954, now abandoned, the carbinols can be esterified at the carboxyl group with a variety of alcohols or can be esterified at the alcohol group with a variety of acids. Further, the carbinols produced by the process of the invention can be cross-esterified to form polyesters which may be modified with compounds such as pentaerythritol, ethylene glycol, methanol, acetic acid, caproic acid, and the like.

In the adhesive art, the carbinols produced by the process of the invention have been found to be compatible with natural rubber, synthetic rubber, polyvinyl chloride, nitrocellulose, ethyl cellulose and vinyl chloride-vinyl acetate copolymers.

In the printing ink field, the carbinols are soluble in alcohols and spirits and impart such properties as scuff resistance, gloss retention, solvent release, etc.

This application constitutes a continuation-in-part of my application for United States Letters Patent, Serial No. 465,426, filed October 28, 1954, now abandoned.

What I claim and desire to protect by Letters Patent is:

1. A process for the preparation of saturated carbinols which comprises heating reactants consisting essentially of carbon monoxide, hydrogen, and a material selected from the group consisting of rosin and olefinically unsaturated rosin compounds, the molar ratio of carbon monoxide to hydrogen being from about 1:1 to 1:20, at a temperature of from about 120° to 230° C. and at a pressure of about 1500 to 15,000 p.s.i. in an inert solvent in the presence of a cobalt carbonyl catalyst, said inert solvent being selected from the group consisting of aliphatic hydrocarbons containing 5-9 carbon atoms, cycloaliphatic hydrocarbons containing 5-8 carbon atoms, aromatic hydrocarbons containing 6-10 carbon atoms, aliphatic ketones containing 3-7 carbon atoms, cycloaliphatic ketones containing 5-7 carbon atoms, aliphatic ethers containing 4-10 carbon atoms, chlorinated derivatives of methane containing 2-4 chlorine atoms, chlorinated derivatives of ethane containing 2-5 chlorine atoms, and mixtures thereof.

2. The process of claim 1 in which the inert solvent is a cycloaliphatic hydrocarbon containing 5-8 carbon atoms.

3. The process of claim 1 in which the molar ratio of carbon monoxide to hydrogen is from 1:2 to 1:3.

4. The process of claim 1 in which the material is rosin.

5. The process of claim 1 in which the material is abietic acid.

6. The process of claim 1 in which the material is dextropimaric acid.

7. The process of claim 1 in which the material is an olefinically unsaturated rosin acid ester.

8. The process of claim 1 in which the material is tall oil.

References Cited in the file of this patent

UNITED STATES PATENTS

| | | |
|---|---|---|
| 2,517,416 | Prichard | Aug. 1, 1950 |
| 2,691,047 | Hagemeyer | Oct. 5, 1954 |
| 2,727,815 | Hoffmann et al. | Dec. 20, 1955 |

OTHER REFERENCES

Oxo Process, Tom Reel 36, p. 9.
Levering et al.: Ind. and Eng. Chem., vol. 50, No. 3, pp. 317–322 (1958).